United States Patent [19]

Kini et al.

[11] Patent Number: 4,821,271
[45] Date of Patent: Apr. 11, 1989

[54] METHODS AND CIRCUITS FOR CHECKING INTEGRATED CIRCUIT CHIPS HAVING PROGRAMMABLE OUTPUTS

[75] Inventors: M. Vittal Kini; Mark S. Myers, both of Portland; Sunil Shenoy, Beaverton, all of Oreg.

[73] Assignee: Intel Corporation, Santa Clara, Calif.

[21] Appl. No.: 79,444

[22] Filed: Jul. 30, 1987

[51] Int. Cl.$^4$ .................................. G01R 31/28
[52] U.S. Cl. ........................................ 371/68; 371/25
[58] Field of Search ................ 371/15, 20, 24, 25, 371/29, 67, 68; 364/200, 900

[56] References Cited

U.S. PATENT DOCUMENTS

| | | | |
|---|---|---|---|
| 4,176,258 | 11/1979 | Jackson | 371/68 |
| 4,309,768 | 1/1982 | Ault | 371/68 |
| 4,583,041 | 4/1986 | Kimura | 371/25 |
| 4,710,930 | 12/1987 | Hatayama | 371/25 |
| 4,739,504 | 4/1988 | Leslie | 371/68 |
| 4,739,505 | 4/1988 | Leslie | 371/68 |
| 4,739,506 | 4/1988 | Leslie | 371/68 |

Primary Examiner—Michael R. Fleming
Attorney, Agent, or Firm—Owen L. Lamb

[57] ABSTRACT

A functional-redundancy checking logic for checking identical chips whose outputs are time-variant programmable. Window logic (40, 60) on each chip creates a window associated with each programmed transition, set pulse (14) and reset pulse (15). For the set pulse (14), on the rising edge (42) of the window, an error flip-flop (50) is set. The flip-flop is merely set at this time; an error is not flagged. The window remains open for a fixed time period. During the time period that the window is open, if the output pin (24) is ever correctly asserted, then the flip-flop (50) is reset, thus clearing the error flag. However, if the pin (24) always remains incorrectly asserted, indicating an error, then the error flip-flop (50) remains set. When the window closes on the falling edge (46) of the window pulse, an error report pulse is created via the AND (52). The value on the flip-flop (50) at this time is reported as an error (54). An identical circuit checks the programmable reset pulse (15).

4 Claims, 2 Drawing Sheets

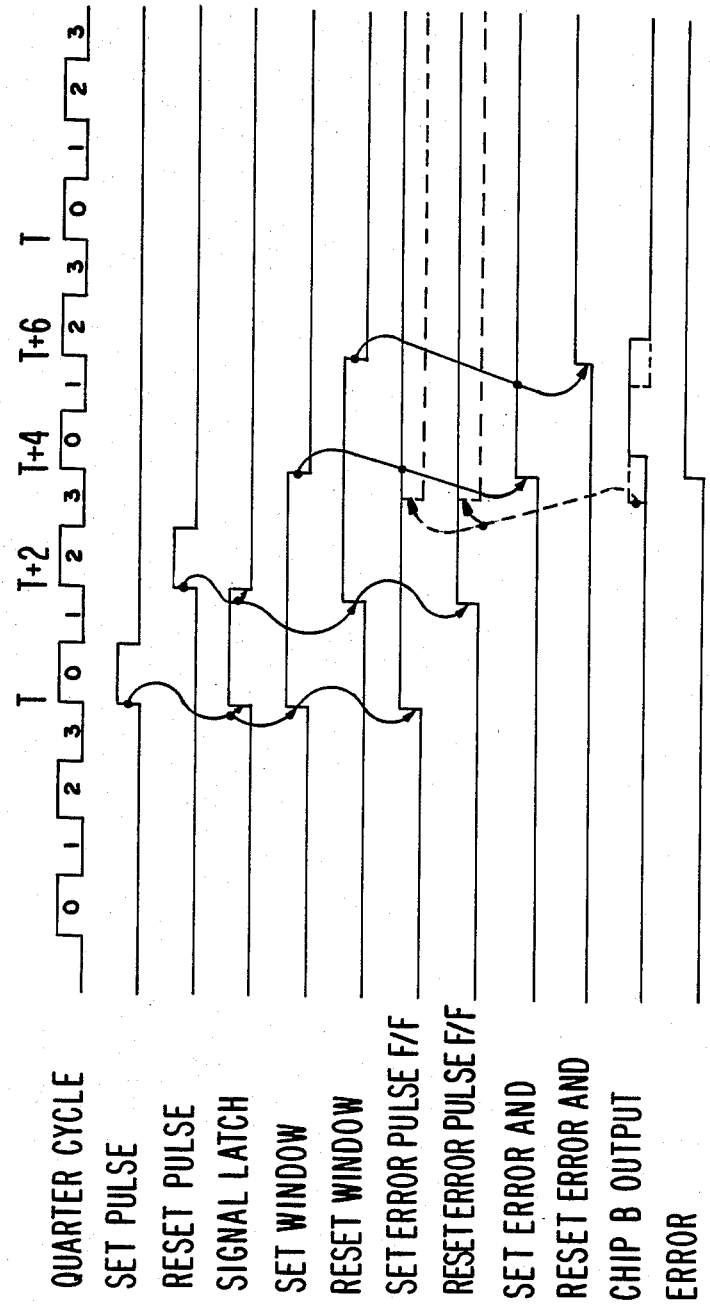

METHODS AND CIRCUITS FOR CHECKING INTEGRATED CIRCUIT CHIPS HAVING PROGRAMMABLE OUTPUTS

CROSS REFERENCES TO RELATED APPLICATIONS

U.S. Pat. No. 4,785,428 granted on Nov. 16, 1988 to Baqwa, et al., entitled "Programmable Memory Array Control Signals" and copending patent application Ser. No. 898,522 filed Aug. 21, 1986, of Johnson, et al., entitled "Apparatus for On-line Checking and Reconfiguration of Integrated Circuit Chips", both assigned to Intel Corporation, the assignee of the present invention.

BACKGROUND OF THE INVENTION

2. Technical Field

The present invention relates to data processing systems, and more particularly to a method and apparatus for checking integrated circuit chips having programmable signal lines.

3. Background Art

U.S. Pat. No. 4,176,258 of Daniel Jackson, granted on Nov. 27, 1979, discloses a method and circuit for checking integrated circuit chips commonly known as functional redundancy checking (FRC). The basic principle is to have a master-checker pair of identical chips connected in parallel. Only one chip, the master, actually drives its outputs. The other chip, the checker, inhibits its outputs. There is checking circuitry on each identical chip. This checking circuitry is activated only on the chip designated as the checker, thus making it possible to fabricate the chips identically, with the advantage of only one part number and no external error checking circuitry. When activated, the checking circuitry compares the value on the output pins of the two chips. If the compared values differ, then an error is flagged.

In the prior FRC scheme, the time during which the comparison take place is not variable and is usually some fixed time after an output pin should have been driven. This is possible because the data-processing logic in the chip drives each output pin at a fixed time in the processor cycle. This also implies a maximum settling time for the pin value. If the external load is such that the output pin does not settle to its expected value before the checking circuitry makes its comparison, then the checking circuit will use the wrong value and flag a false error (or miss a real one).

The above-identified U.S. Pat. No. 4,785,428, discloses a memory control unit (MCU) that will generate any pattern of control signal timings to provide a range of timing controls for dynamic random access memory (DRAM) operations.

The transitions on the pins are user-programmable and do not occur at a fixed time in the processor cycle. In fact, the pin may even change twice in a cycle. An FRC logic must take this into account. Also, the external loads may cause settling times to vary so that the point of comparison of the output value has to be determined in a more complex manner.

It is therefore an object of the present invention to provide a redundant checking logic for integrated circuit chips the outputs of which are time-variant programmable.

SUMMARY OF THE INVENTION

Briefly, the above object is accomplished in accordance with the present invention by window logic which creates a window associated with each programmed transition on the output pin. On the rising edge of the window, an error flip-flop is set. The flip-flop is merely set at this time; an error is not flagged. The window remains open for a fixed time period. During the time period that the window is open, if the output pin is ever correctly asserted, then the error flag is cleared. However, if the pin always remains incorrectly asserted, indicating an error, then the error flip-flop remains set. When the window closes (on the falling edge of the window pulse), an error report pulse is created. The value on the flip-flop at this time is reported to an error detection subsystem.

DESCRIPTION OF THE DRAWINGS

The foregoing and other objects, features, and advantages of the invention will be apparent from the following more particular description of a preferred embodiment of the invention as illustrated in the accompanying drawings wherein.

DESCRIPTION

Figure 1:
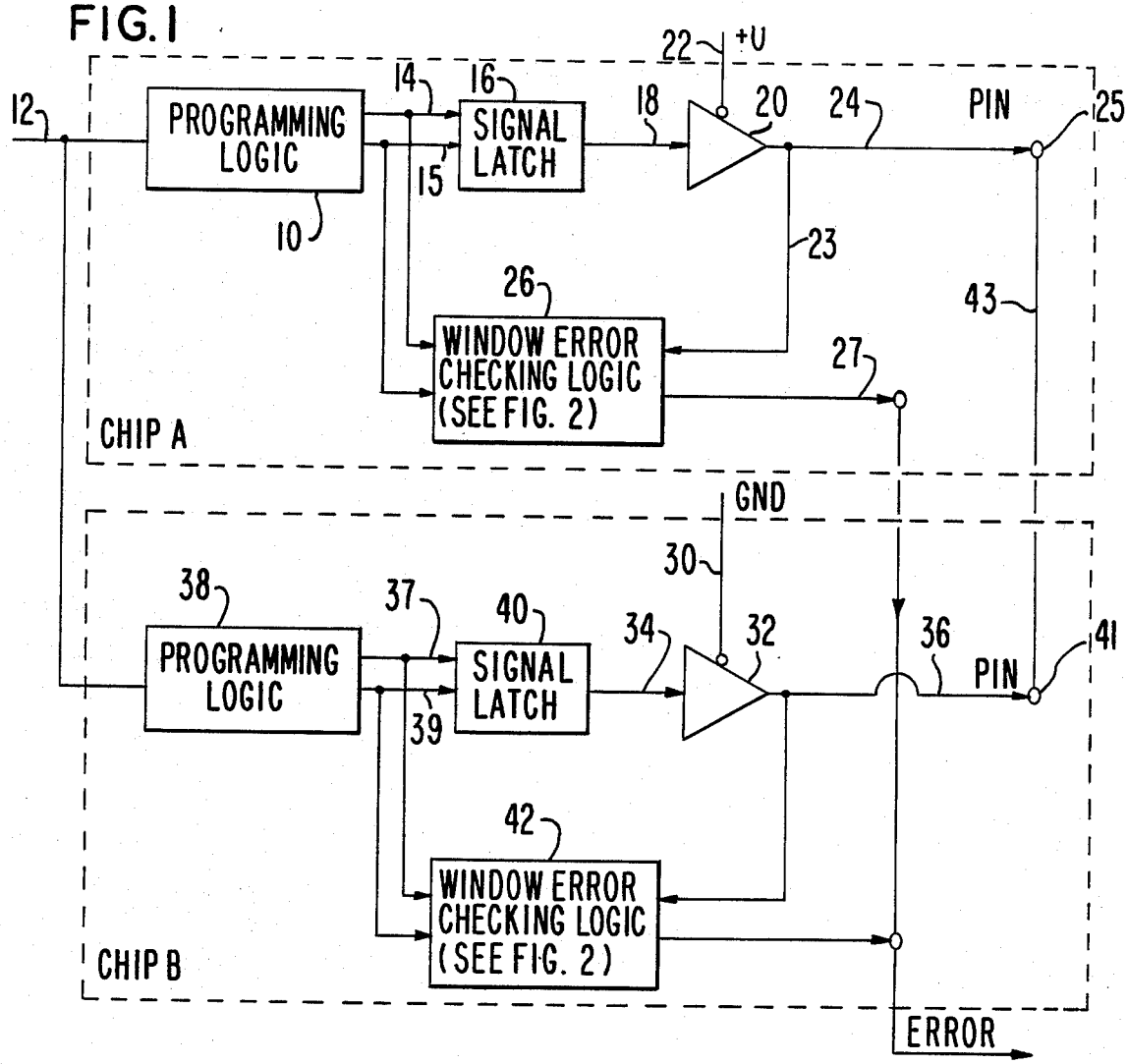
FIG. 1 is a block schematic diagram of two integrated circuit chips wired in parallel in accordance with the principles of the present invention.

Referring now to FIG. 1, two integrated circuit chips, Chip A and Chip B, are shown enclosed within the two dotted-line boxes. Both chips may be manufactured identically and therefore may have the same part number. Each chip has programming logic (10) fabricated thereon, which may be any integrated circuit which will respond to an input (12) and provide outputs (14, 15), which bear some predetermined relationship to the input, depending upon the function performed by the logic (10). A window error-checking logic (26) is fabricated on the chip and is shown in more detail in FIG. 2.

The set output (14) of the programming logic (10) is supplied directly to the set input of a signal latch (16). The reset output (15) of the programming logic (10) is supplied directly to the reset input of a signal latch (16). The output (18) of the signal latch (16) is supplied directly to one input of a three-state driver (20). The three-state driver (20) has an enable input (22), which is connected to a check input pin on the integrated-circuit package. The output (24) of the driver is connected to an external chip data output pin and is also connected to the window error-checking logic (26). When the check input pin (22) is energized, the driver (20) is disabled so that no data on the output (18) passes therethrough. The driver (20) may be any multistate device either totally self-contained on the chip such as a latch, a simple switch, or a blowable link, or may partially rely on an external signal, such as a check pin with its associated on-chip support logic.

Chip B is identical to Chip A. On Chip B, the check input pin (30), is tied to ground so that the driver (32) on Chip B is energized to a low-impedance state, allowing the data on output (34) to pass therethrough to the chip data output pin (36) of Chip B. All of the pins of Chip A and Chip B, with the exception of the check input pins, are wired in parallel. The chip data input (12) is supplied to both programming logic circuit (10) on Chip A and

(38) on chip B. Therefore, both chips receive the same input data and should generate the same outputs (18, 34), if both chips are functioning properly. The output (34) of latch (40) passes through the driver (32) to the chip B data output (36). Since the chip data outputs of both chips are wired in parallel, this chip B data is supplied as an input to the window error-checking logic (26) on Chip A. This data is also supplied to the window error-checking logic (42) of Chip B.

The output of the latch (16) does not pass through the driver (20) on Chip A because this driver is energized to a high-impedance state by the positive voltage (+V) on the check input pin (22). However, the set pulse output (14) and reset pulse output (15) are applied to the window error-checking logic (26) where they are used for checking the chip data output (36) of Chip B. If there is a malfunction in either Chip A or Chip B during the period of time that the window is open, the window error-checking logic (26) will generate an output (27) over the error-output line.

Figure 2:
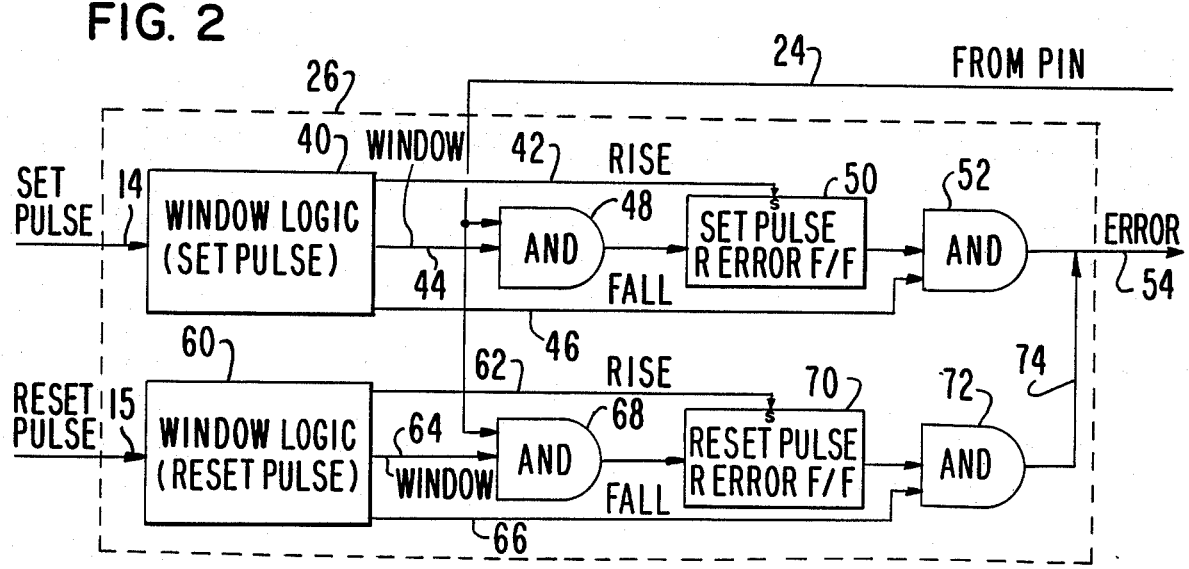
FIG. 2 is a more detailed block diagram of the window checking logic on chip A shown in FIG. 1 and, FIG. 3 is a timing diagram of the operation of chip B shown in FIG. 1.

Refer now to FIG. 2 which is a detailed block diagram of the window logic (26) of FIG. 1 and FIG. 3 which is a timing diagram. The set-pulse window logic (40) creates a window associated with each set-pulse programmed transition. Suppose that a pin is programmed to be asserted at quarter cycle T. Then the window logic (40) does the following. On the rising edge (42) of the window, a set-pulse error flip-flop (50) is set. The flip-flop is merely set at this time; an error is not flagged. The set-pulse window remains open until time T+4. During the time that the window is open, if the chip B output pin (36) is ever correctly asserted, then the error flag is cleared by resetting the set-pulse flip-flop via a line (24) activating the AND circuit (48). However, if the pin (24) always remains incorrectly asserted, indicating an error, then the set-pulse error flip-flop (50) remains set. When the window closes on the falling edge (46) of the window pulse, an error report pulse (54) is created through the AND circuit (52). The value on the set-pulse flip-flop (50) at this time is reported to an error detection subsystem.

There is identical window logic for the reset-pulse logic. This works in parallel with the set logic, exactly as described above. The two windows may be concurrently open but are independent of each other.

The reset-pulse window logic (60) creates a window associated with each reset-pulse programmed transition. On the rising edge (62) of the window, a reset-pulse error flip-flop (70) is set. The flip-flop (70) is merely set at this time; an error is not flagged. The reset-pulse window remains open until time T+6. During the time that the reset-pulse window is open, if the output pin (24) is ever correctly asserted, then the error flag is cleared by resetting the reset-pulse flip-flop (70) through the AND circuit (68). However, if the pin (24) always remains incorrectly asserted, indicating an error, then the reset-pulse error flip-flop (70) remains set. When the window closes, on the falling edge (66) of the window pulse, an error report pulse (74) is created through the AND circuit (72). The value on the reset-pulse flip-flop (70) at this time is reported to an error detection subsystem.

Refer to FIG. 3. Suppose for example, a pin is programmed to be set at time T and reset at time T+2. Then, the set window will be open from T to T+4, and the reset window from time T+2 to T+6. If the pin gets set before time T+4 (as shown by the dotted lines CHIP B OUTPUT) and reset before T+6, then at that time the SET ERROR PULSE F/F and RESET ERROR PULSE F/F are both reset, and neither a set error nor a reset error is reported. If the pin never gets set between T and T+4, then at T+4, a set error is reported. If the pin never gets reset between T+2 and T+6, then at T+6 a reset error is reported.

The circuit shown in FIG. 2 is a comparison circuit; however, it is not intended that the present invention be limited to comparison checking. The principles are the same, regardless of the type of checking operation performed.

While the invention has been particularly shown and described with reference to preferred embodiments thereof, it will be understood by those skilled in the art that the foregoing and other changes in form and detail may be made therein without departing from the scope of the invention.

What is claimed is:

1. The method of checking the output pin (18) of a first integrated circuit chip against the output pin (41) of a second substantially identical integrated-circuit chip, comprising the steps of:

Inputting data from substantially identical sources to programming logic (10) on said first chip and to programming logic (38) on said second chip;

Programming output data from said programming logic (10) on said first chip such that a set pulse (14) turns on output signal (18) on at a specific time and a reset pulse (15) turns said output signal off at a later time;

Programming output data from said programming logic (38) on said second chip the same as for said first chip such that a set pulse (37) turns an output signal (34) on at said specific time and a reset pulse (39) turns said output signal (34) off at said later time;

Generating a window having a rising edge (42) and a falling edge (46) in response to said set pulse (14);

Setting an error flip-flop (50) on said rising edge (42) of said window;

Utilizing a signal (24) asserted on said output pin (25) to reset said error flip-flop (50);

Signaling an error report (54) on the falling edge (46) of said window;

Inhibiting said output signal (18) of said first chip so that data on said output (18) does not reach the output pin (25) of said first chip;

Uninhibiting said output signal (34) of said second chip so that data on said output (34) does reach the output pin (41) of said second chip; and Connecting said output pin (41) of said second chip to the output pin (25) of said first chip.

2. An integrated circuit chip comprising:

programming logic (10) for generating a set pulse (14) and a reset pulse (15);

set-pulse window logic (40) for generating a first window (44);

reset-pulse window logic (60) for generating a second window (64);

said output (14) of said programming logic (10) being connected to an input of said set-pulse window logic (40);

said output (15) of said programming logic (10) being connected to an input of said reset-pulse window logic (60);

gating means (20) capable of being in a first state and a second state for inhibiting when in said first state and not inhibiting when in said second state, signals from passing therethrough from an input (18) to an output (24) thereof;

a signal latch (16) connected to said programming logic (10);

the output of said signal latch (16) being connected to the input of said gating means (20);

said programming logic (10) being programmable such that said set pulse (14) turns said output signal latch (16) on at a specific time said reset pulse (15) turns said output signal latch (16) off at a later time;

a set-pulse error flip-flop (50) connected to said set-pulse window logic (40);

means for setting said set-pulse error flip-flop (50) on the rising edge (42) of said first window (44);

a reset-pulse error flip-flop (70) connected to said reset-pulse window logic (60);

means for setting said reset-pulse error flip-flop (70) on the rising edge (62) of said second window (64);

an output pin (25);

means (48, 68) connected to said first and second window logics (40, 60) and to said output pin (25) for resetting said set-pulse error flip-flop (50) and said reset-pulse error flip-flop (70) upon the condition that said pin (24) is asserted during the time that said windows (44, 64) are open;

means (52) for signaling an error report (54) on the falling edge of said set-pulse window (46) upon the condition that said set-pulse error flip-flop (50) is in its set state; and, means (72) for signaling an error report (74) on the falling edge of said reset-pulse window (66) upon the condition that said reset-pulse error flip-flop (70) is in its set state.

3. The integrated circuit chip of CLAIM 2 further comprising:

means (20) for inhibiting the output (18) of said chip so that said data does not reach said output pin (25); and means (25) for connecting said output pin (25) of said chip to said window logic (48, 68).

4. Apparatus for checking first and second substantially identical integrated-circuit chips having data-processing logic and window error-checking logic on each chip, comprising:

programming logic (10) on said first chip;

programming logic (38) on said second chip;

first means for programming output data from said programming logic (10) on said first chip such that a set pulse (14) turns an output signal (18) on at a specific time and a reset pulse (15) turns said output signal off at a later time;

second means for programming output data from said programming logic (38) on said second chip the same as for said first chip such that a set pulse (37) turns an output signal (34) on at said specific time and a reset pulse (39) turns said output signal (34) off at said later time;

window logic for generating a window having a rising edge (42) and a falling edge (46) in response to said set pulse (14);

an error flip-flop (50);

means for setting said error flip-flop on said rising edge (42) of said window;

said error flip-flop (50) being reset by a signal (24) asserted on said output pin (25);

means for signaling an error report (54) on the falling edge (46) of said window;

means (20, 22) for inhibiting said output signal (18) of said first chip so that data on said output (18) does not reach the output pin (25) of said first chip;

means (32, 30) for uninhibiting said output signal (34) of said second chip so that data on said output (34) does reach the output pin (41) of said second chip; and means (43) for connecting said output pin (41) of said second chip to the output pin (25) of said first chip.

* * * * *